United States Patent
Horwat et al.

(10) Patent No.: US 7,361,713 B2
(45) Date of Patent: Apr. 22, 2008

(54) BLUSH RESISTANT ADHESIVES USED IN BOTTLE LABELING

(75) Inventors: David William Horwat, Emmaus, PA (US); Richard Patrick Szuchyt, Slatington, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 394 days.

(21) Appl. No.: 11/017,483

(22) Filed: Dec. 20, 2004

(65) Prior Publication Data

US 2006/0135696 A1 Jun. 22, 2006

(51) Int. Cl.
*C08F 8/30* (2006.01)
*C08F 20/10* (2006.01)

(52) U.S. Cl. .............. 525/330.5; 525/183; 525/329.7; 525/329.9; 525/330.1; 525/330.3

(58) Field of Classification Search ............... 525/183, 525/329.7, 329.9, 330.1, 330.3, 330.5
See application file for complete search history.

(56) References Cited

U.S. PATENT DOCUMENTS

| 3,939,108 A | 2/1976 | Sirota et al. |
| 4,462,838 A | 7/1984 | Jandres et al. |
| 5,455,066 A | 10/1995 | Broich et al. |
| 6,590,019 B2 | 7/2003 | Dheret et al. |
| 6,590,031 B2 | 7/2003 | Harvey et al. |

FOREIGN PATENT DOCUMENTS

| JP | 03052981 | 7/1991 |
| WO | WO 93/04407 | 3/1993 |
| WO | WO 01/98422 A1 | 12/2001 |
| WO | WO 03/029378 A1 | 4/2003 |

*Primary Examiner*—Ana Woodward
(74) *Attorney, Agent, or Firm*—Mary E. Bongiorno; Russell L. Brewer

(57) ABSTRACT

This invention is directed to an improvement in acrylic based adhesives that are particularly suited for use in the application of paper and plastic labels onto glass surfaces, such as in bottle labeling. The base adhesive is comprised of an emulsion polymerized acrylic copolymer having acid functionality, e.g., carboxyl or sulfonic acid functionality; wherein the emulsion polymerization is carried out in the presence of a stabilizer system comprising a polymer containing polymerized units of carboxylic acid. The improvement for enhancing the blush resistance of the adhesive resides in incorporating a long chain crosslinking polyamine or polyamide containing residual amines.

6 Claims, No Drawings

BLUSH RESISTANT ADHESIVES USED IN BOTTLE LABELING

BACKGROUND OF THE INVENTION

Aqueous adhesives have been widely used for bonding paper and plastic labels to glass and plastic surfaces. Bottle labeling adhesives are a subset of such aqueous adhesives. Labels are applied to beverage containers by high speed machines which transfer the adhesive to the label. Once coated with adhesive, the label is contacted with the container for permanent adhesion. Mechanical labeling via automated high speed machines requires the coordination of the criteria of numerous physical properties during the processing stage and, on the finished labeled product. During processing the adhesive must be capable of flowing, i.e., it should have a viscosity preferably within a range from about 20,000 to 200,000 mPas, have a high initial adhesion, which prevents undesired displacement of a freshly attached label on a base, and able to be processed on machines working with high-speed emulsions. Natural polymers such as starch and casein are often used as the base polymer in bottle labeling adhesives. Starch and casein based adhesives can be formulated to offer advantages such as machinability, high wet strength, and ice water resistance.

Recent ecological pressure has reversed the trend toward "non-returnable" bottles and reemphasized the need for "returnables". As a result, many of the prior requirements for bottle labeling adhesives have been altered. One of the primary requirements for returnable bottles is that the labels be easily removed from the bottle prior to reutilization. The inability to remove the labels has made recently developed bottle labeling adhesives unacceptable for commercial operations. Casein based adhesives have been widely used since the dried adhesive film is responsive to caustic cleaning solutions. Starch based adhesives can also be used; however these adhesives are more difficult to clean with a caustic wash.

A current trend in the bottle industry is to use clear labels, and as such, they too impose new requirements of the adhesive. Many of the current adhesives which can be used in producing removable, clear bottle labels have the problem that they discolor (blush), when wet. Bottles often are placed in ice baths and, not only must the adhesives be ice-proof they also must be blush resistant. Adhesives, therefore, must possess an optimum balance in properties of being blush resistant, cold water resistant, and yet, allow the labels to be easily removed or stripped from the bottles.

Starch glues or dextrin glues have been widely used as adhesives for bottle labeling. However, they are not suited for producing blush resistant labels. Starch and ammonium salts of styrene-maleic anhydride resins have been used as they exhibit superior ice-proof properties. However, the bond formed by many of these adhesives is so strong that removal of the label, even upon soaking in hot alkaline water, is difficult or impossible.

Representative patents illustrating aqueous adhesive compositions useful for bottle labeling include:

U.S. Pat. No. 3,939,108 discloses a cold water resistant adhesive which has an optimum balance of cold water resistance and removability when employed for labeling of bottles. The adhesive comprises a mixture of starch, starch-maleic anhydride, peptizer, water and some alkali.

U.S. Pat. No. 4,462,838 discloses aqueous adhesives based upon starch derivatives for application in mechanical bottle labeling on high speed machines, particularly glass ware. The adhesives are comprised of a hydroxyalkyl ether of oxidized starch and a water-soluble synthetic polymer, casein or starch derivative. Examples of water-soluble polymers are polyvinyl pyrrolidone, vinyl acetate copolymers, and acrylic acid copolymers.

U.S. Pat. No. 5,455,066 discloses an aqueous adhesive based upon acid precipitated casein, water-soluble extenders, natural or synthetic resin acids, resin alcohols, and so forth for bottle labeling. Extenders are based upon copolymers of acrylic acid, acrylamides, starches, starch ethers and the like.

U.S. Pat. No. 6,590,031 discloses a pressure sensitive adhesive comprised of a polymer of an alkyl acrylate, carboxylic acid and styrene formed by polymerizing the monomers in the presence of an anionic surfactant and redox type free radical initiator. The polymers find use in clear label applications, making films, etc, and it is reported they exhibit excellent adhesion to hot water and enhanced resistance to water-whitening.

WO 03/029,378 discloses a water based adhesive that is suited for bonding plastic labels onto glass containers. The adhesive comprises a starch component and a gelatin compound.

WO 01/98422 discloses a water-based bottle labeling adhesive that promotes adhesion of paper or polysubstrates to plastic or poly-coated glass surfaces. The adhesive comprises from 30 to 80% of a synthetic base polymer, e.g., polyvinyl pyrrolidone, polyacrylic acid derivatives, carboxylated ethylene-vinyl acetate polymers, acrylic polymers, a tackifier, and additives and water. Examples of crosslinkers for the adhesives include zinc oxide, glyoxal and the like.

BRIEF SUMMARY OF THE INVENTION

This invention is directed to an improvement in acrylic based adhesives that are particularly suited for use in the application of paper and plastic labels onto glass surfaces, such as in bottle labeling. The base adhesive is comprised of an emulsion polymerized acrylic copolymer having acid functionality, e.g., carboxyl or sulfonic acid functionality; wherein the emulsion polymerization is carried out in the presence of a stabilizer system comprising a polymer containing polymerized units of carboxylic acid. The improvement for enhancing the blush resistance of the adhesive resides in incorporating a long chain crosslinking polyamine or polyamide selected from the group consisting of long chain aliphatic polyamines, cycloaliphatic diamines, particularly cyclohexane diamine, and cyclohexane derivates including oligomers of methylene bridged cyclohexane diamines, isophorone diamine, long chain polyamides, polyether polyamines, and the like. In this invention, the polyamides contain residual amines.

Significant advantages can be achieved in adhesives incorporating the polyamine additive and they include:

an ability to produce non blushing, very water resistant adhesive formulations for use in bottle labeling;

an ability to yield water resistant, non blushing formulations for clear labels;

an ability to produce very efficient, high viscosity formulations with excellent rheology and speed of set; and, an ability to produce clear labels which are removable in a caustic wash employed in bottle recycling.

DETAILED DESCRIPTION OF THE INVENTION

Acrylic polymers have been used for producing removable bottle labeling adhesive formulations are generally all acrylic polymers polymerized in the presence of a styrene-carboxylic acid protective colloid or anionic surfactant with acid functionality polymerized therein. Alkyl esters of (meth)acrylic acid are incorporated into the polymer in various ratios and amounts. Representative alkyl esters of (meth)acrylic acid include methyl acrylate, ethyl acrylate, butyl acrylate, 2-ethylhexyl acrylate, octyl acrylate, methyl methacrylate, and the like.

Carboxyl functionality is incorporated into the adhesive polymer by polymerizing the alkyl esters of (meth)acrylic acid in the presence of a protective colloid of styrene/acrylic acid or via polymerization with acrylic acid or other carboxyl functional monomers. Examples of carboxylic monomers include methacrylic acid, itaconic acid, crotonic acid, and the like. Sulfonic acids can also be polymerized into the polymer, although it is preferred that carboxyl functionality be employed. These acrylate esters, although having a number of properties acceptable as adhesives for bottle labeling, suffer from low viscosity requiring blush resistant, viscosity building additives when applied to clear labels for glass bottles.

The acrylic bottle labeling polymers are formed by emulsion polymerization. Typically the styrene-carboxylic acid seed polymer, e.g., a styrene-acrylic acid, or styrene-maleic anhydride seed polymer is employed as a stabilizing agent. Alternatively an anionic surfactant or mixture of anionic surfactant and styrene-carboxylic acid polymer is used as a stabilizing system. A conventional styrene-carboxylic acid functional polymer generally incorporates from about 40 wt % to about 80 wt %, preferably from about 50 to 70 wt % styrene, based on the total weight of the monomer mixture.

Surfactants suitable for use in the forming the bottle labeling adhesive are anionic surfactants. Examples of anionic surfactants include ammonium salts of nonylphenol ethoxylated sulfates; lauryl ether sulfates or sulfosuccinates. A single anionic surfactant or mixture of anionic surfactants can be used. Typically, less than 4 wt % of the anionic surfactant based on the total weight of the latex, is used.

A redox type free radical initiator system often is used to promote polymerization of the acrylic ester monomers. The initiator is peroxide or hydroperoxide such as t-butyl hydroperoxide. The reducing agent used in the redox system is zinc formaldehyde sulfoxylate, sodium formaldehyde sulfoxylate, ascorbic acid, isoascorbic acid, sodium metabisulfite and the like. A preferred redox type system consists of t-butyl hydroperoxide and zinc formaldehyde sulfoxylate.

The aqueous latex emulsions, which form the basis of the adhesives of the present invention, are prepared in a single stage synthesis with or without a seed in the reaction vessel prior to beginning the monomer feed. Preferably the emulsion polymerization is carried out using a seed latex based upon a polymer of styrene and acrylic acid. Reaction temperatures during the monomer feed can range from about 50° C. to about 90° C.

Once the polymerization is complete it may be desirable to adjust the pH of the latex emulsion in order to enhance its stability. Ammonia addition is the preferred method of adjusting pH for the bottle labeling adhesives. Other ingredients commonly used in the preparation of aqueous latex emulsions such as buffering agents, chain transfer agents, and the like may be present. In addition to the aqueous latex emulsion, the bottle labeling adhesive may also contain additional components such as, biocides, wetting agents, defoamers, tackifiers, etc.

Other components which may be added to the aqueous adhesive formulations include natural or synthetic polymers such as starches or converted or modified starches, casein and synthetic polymers such as poly(vinyl pyrrolidone), poly(vinyl alcohol), acrylic acid containing water soluble dispersible acrylic polymers, thickeners, etc. However, starches and casein in even small amounts may lead to unacceptable blushing when the label is in contact with water. Thus, care must be exercised when adding starches and the like.

The improvement for improving the blush resistance of acrylic polymers commonly employed in bottle labeling applications are obtained by incorporating a small amount, i.e., from 0.25 to 5 weight parts, typically from 0.5 to 3 weight parts per 100 weight parts of the acrylic emulsion of a long chain, hydrophobic aliphatic polyamine or polyamide containing residual amines. Appropriate amines contain 6 to 25 carbons and include aliphatic polyamines, or cycloaliphatic polyamines, typically a cycloaliphatic diamine, aromatic polyamines, and long chain polyamides containing residual amines. Low molecular weight polyamines, particularly the polyalkylene polyamines, afford blush resistance but generally are too volatile and contribute to odor problems. Common amines are selected from the group consisting of polyethyleneimine, and cyclohexane diamine or derivatives thereof, such as methylcyclohexane diamine, methylene bridged cyclohexane diamines, including methylene di(4-cyclohexylamine), cyclohexyl propanediamine, isophorone diamine, and partial or full hydrogenated derivates of methylenedianiline.

Examples of commercially available amines or amides suitable for use in this invention are sold under the tradenames Anquamine®, Ancamide®, Anquamide®, and Ancamine® curing agents, available from Air Products and Chemicals, Inc.

Aliphatic and cycloaliphatic polyamines or polyamides are added generally in an amount of from 0.5 to 3 parts preferably from 1 to 2 weight parts per 100 weight parts of the emulsion based upon 50% polymer solids content in the emulsion or 0.25 to 2.5 parts (preferably 0.5 to 1 part) cycloaliphatic polyamine per 100 parts adhesive polymer. The addition of the amine or amide does at least two things; it replaces ammonia which is volatilized from the transparent label on drying and it provides for viscosity build of the final product. Prior to addition of the amine or amide, the viscosity of the bottle labeling acrylic emulsion may range from about 2000 to 3000 cps. On addition of the amine or amide, the viscosity may build to 10,000 to 200,000 cps. Typically, the viscosity varies with the amine or amide and the adhesive base. The viscosity requirements depend upon the type of label, the labeling machine, its speed and the environmental conditions. Thus, viscosities can range from 20,000 cps to 200,000 cps at 72° F., (22° C.); however they will generally be within the range of 20,000 cps and 100,000 cps. Viscosities can be measured with a Brookfield viscometer using the appropriate spindle at 20 RPM and 22° C.

Some of the long chain polyamines such as the meta-xylenediamine, the cycloaliphatic amines and, particularly the hydrogenated methylenedianiline derivatives result in very high viscosity builds. Often it is desired to blend these amines with other kinds of polyamines to achieve desirable blush resistance with acceptable viscosity. Usually, the desired upper level of the amine or amide is based upon the viscosity build. Some amines may be used at higher levels than others to reach the desired viscosity range.

Long chain amides, e.g. those formed by the reaction of $C_{6\ to\ 20}$ carboxylic acids and polyethylene polyamines, such as triethylenetetramine and tetraethylenepentamine, may also be used, provided the amides contain residual amine.

Defoamers, preservatives, humectants, clay, masking agents, color agents and other modifying agents may be added without affecting the desirable properties of the adhesives of the invention. Thus, modifying agents such as wheat flour, bentonite, etc. may be employed for additional shortness and for machining requirements. Defoamers including tributyl phosphate, preservatives such as phenol, color agents like caramel and plasticizers and hygroscopic agents such as glycols, glycerine, and fatty acids may also be employed as required.

Virtually any commonly available label can be used with the adhesive compositions of the invention. Labels typically are prepared from thin sheet-like materials and can be made from a variety of materials including paper, polymer films, foil, film to polyester sheets, woven and nonwoven fabrics, and other sheet-like materials. Preferably labels formed of paper, polymer films or metallized polymers are used.

The following examples are provided to illustrate various embodiments and comparisons and are not intended to restrict the scope of the invention.

For film testing, a film was cast on a clean glass plate by using a 10 mil Bird bar applicator to apply a wet film of formulated emulsion to be tested. The film was allowed to dry 24 hours at room temperature and 50% relative humidity (RH) before testing. The film was visually inspected fro grit particles by holding the coated glass plate up to a light source and qualitatively evaluating the amount of dry grit particles present or by visually examining for streaking from the application process. The coated plate was then immersed for a specified time period into room temperature water and the amount of blushing was visually determined versus a control plate (coated with an unmodified polymer emulsion). The state of blush and the time of immersion were recorded. The designation for blush resistance varied from 1 for little blush to 4 for a lot of color. A blush value of 0-2 is preferred for clear labels.

Viscosities were measured with a Brookfield viscometer at 20 RPM and 22° C.

EXAMPLE 1

Styrene-Acrylate Bottle Labeling Adhesive

An acrylate polymer designed for commercial bottle labeling applications was prepared using 1300 g of a seed latex of a styrene/a-methyl styrene/acrylic acid (1:1:1 weight ratio) copolymer. The seed latex was added with agitation (150 rpm) to water (4030 g) in a 3 gallon reactor at room temperature. Aqueous ammonia (28 wt %, 315 g) was added slowly, and the resulting mixture was heated to 80° C. to effect dissolution of the copolymer. The pH of this solution was between 8.1 and 8.4. After the copolymer was dissolved, a solution of ammonium persulfate (31.5 g) in water (340 g) was added to the reactor and allowed to mix for 5 minutes.

A monomer delay consisting of 2-ethylhexyl acrylate (2100 g), butyl acrylate (2100 g) and styrene (525 g) was added to the reactor at a rate of 28.1 g/min for 60 minutes. At the 60 minute mark, the polymerization temperature was lowered to 75° C., and the monomer delay rate lowered to 16.3 g/min. The monomer delay was continued at this rate until it was completely added. At the 120-minute mark, additional water (810 g) was added to the polymerization at 5.8 g/min.

When the monomer delay was completed, residual monomer was rinsed from the monomer delay tube into the reactor by adding water (200 g) to the monomer delay tubes and feeding this water to the polymerization reactor. After the delay monomer and delay water feeds were finished, the reactor temperature was held at 75° C. for 30 minutes. The reaction mixture was then cooled to 50° C., and a solution of tert-butyl hydroperoxide (70 wt %, 21.1 g) in water (130 g) was added to the reactor. After mixing for 5 minutes, a solution of sodium erythorbate (14.6 g) in water (130 g) was added to the reactor. The reactor was then held at 50° C. for an additional 30 minutes to reduce monomer levels. After monomer levels were confirmed to be below 1000 ppm by gas chromatography, additional aqueous ammonia (28 wt %, 40 g) was added to the reactor and the final emulsion polymer (ca. 50% solids) was cooled to room temperature.

EXAMPLE 2

Evaluation of Amines as Blush Resistant Additives

A series of bottle labeling adhesive formulations was prepared using the acrylate emulsion of Example 1. The amines were added to the emulsion at levels of from 1 to 2 weight percent of the emulsion. Films were cast on glass plates and immersed in water. Blush resistance and polymer properties were measured. The results are shown in Tables 1 through 15.

TABLE 1

| Parts Polymer of Ex. 1 | 100 | 100 | 100 | 100 | 100 |
|---|---|---|---|---|---|
| Parts IPDA | 0 | 1 | 2 | 1 | 2 |
| Film | Clear | Clear | Clear | Clear | Clear |
| Gritty | No | No | No | No | No |
| Viscosity | 2110 | 5740 | 20650 | 5820 | 29900 |
| Blush | | | | | |
| 1 min. | 1 | 1 | 1 | 1 | 1 |
| 2 min. | 2 | 2 | 2 | 2 | 1 |
| 3 min. | 2 | 2 | 2 | 2 | 1 |
| 4 min. | 2.5 | 2.5 | 2.5 | 2 | 2 |
| 5 min. | 3 | 3 | 3 | 3 | 2.5 |
| 7.5 min. | 4 | 4 | 4 | 4 | 2.5 |
| 10 min. | | | | | 3 |
| 15 min. | | | | | 4 |

IPDA = Isophorone diamine

Table 1 shows that the control, absent the addition of the cycloaliphatic diamine (isophorone diamine), affords reasonable and acceptable blush resistance, but the viscosity of the emulsion for bottle labeling is too low for some machines. Viscosity builders such as starch or casein, which are common additives, are unsuitable because they destroy the blush resistance of the bottle labeling polymer. Unacceptable blushing, e.g., greater than 4, can occur within 30 seconds to a few minutes.

Table 1 also shows that clear films with essentially no grit were formed when the cycloaliphatic diamine, isophorone diamine, was added to the acrylic adhesive. The viscosity increased at the 1 part level from that of the control where there was no diamine additive to a more favorable viscosity level at the 2 part level. Blush resistance at the 2 part level remained very good.

TABLE 2

| Parts Polymer of Ex. 1 | 100 | 100 | 100 | 100 | 100 |
|---|---|---|---|---|---|
| Parts CHPD | 0 | 1 | 2 | 1 | 2 |
| Viscosity | 2110 | 3180 | 6370 | 2900 | 3350 |
| Film | Clear | Clear | Clear | Clear | Clear |
| Gritty | No | No | No | No | No |
| Blush | | | | | |
| 1 min. | 1 | 1 | 1 | 1 | 1 |
| 2 min. | 2 | 2 | 2 | 2.5 | 2 |
| 3 min. | 2 | 2 | 2 | 2.5 | 2.5 |
| 4 min. | 2.5 | 2.5 | 2 | 2.5 | 2.5 |
| 5 min. | 3 | 3 | 2 | 3 | 3 |
| 7.5 min. | 4 | 4 | 2 | 4 | 4 |
| 10 min. | | | 2.5 | | |
| 15 min. | | | 3 | | |

CHPD = cylcohexylpropane diamine

Table 2 shows that addition of cyclohexylpropane diamine additive provided excellent blush resistance, which was generally equal to or superior to the control, at the 1 and 2 part level. Viscosity build was modest but acceptable. It is believed the lower viscosity in relation to isophorone diamine is caused by the linear alkyl diamine portion. Blush resistance remains good.

TABLE 3

| Parts Polymer of Ex. 1 | 100 | 100 | 100 |
|---|---|---|---|
| Parts DEA | 0 | 1 | 2 |
| Viscosity | 2110 | 2550 | 2310 |
| Film | Clear | Clear | Clear |
| Gritty | No | No | No |
| Blush | | | |
| 1 min. | 1 | 1 | 1 |
| 2 min. | 2 | 1.5 | 2 |
| 3 min. | 2 | 1.5 | 2 |
| 4 min. | 2.5 | 1.5 | 2.5 |
| 5 min. | 3 | 2.5 | 3 |
| 7.5 min. | 4 | 3 | 4 |
| 10 min. | 4 | 4 | 4 |
| 15 min. | 4 | | |

DEA = diethylamine

Table 3 shows that blush resistance is quite good with the alkyl amine but viscosity build is quite limited. Diethylamine also suffers in industrial applications because of objectionable odor.

TABLE 4

| Parts Polymer of Ex. 1 | 100 | 100 | 100 |
|---|---|---|---|
| Parts TETA | 0 | 1 | 2 |
| Viscosity | 2110 | 3010 | 3020 |
| Film | Clear | Clear | Clear |
| Gritty | No | No | No |
| Blush | | | |
| 1 min. | 1 | 1 | 1 |
| 2 min. | 2 | 1 | 1 |
| 3 min. | 2 | 2 | 2 |
| 4 min. | 2.5 | 2.5 | 2.5 |
| 5 min. | 3 | 2.5 | 3 |
| 7.5 min. | 4 | 3 | 4 |
| 10 min. | 4 | 4 | 4 |
| 15 min. | 4 | 4 | 4 |

TETA = tetraethyltetramine

Table 4 shows triethylenetetramine resulted in good blush resistance as did diethylamine but it affords a slightly higher viscosity build. It is believed that linear polyethylene polyamines should have a higher molecular weight in order to achieve desirable viscosities.

TABLE 5

| Parts Polymer of Ex. 1 | 100 | 100 | 100 |
|---|---|---|---|
| Parts Anquamine 401 curing agent | 0 | 1 | 2 |
| Viscosity | 2110 | 3270 | 4170 |
| Film | Clear | Clear | Clear |
| Gritty | No | No | No |
| Blush | | | |
| 1 min. | 1 | 1 | 1 |
| 2 min. | 2 | 2 | 2 |
| 3 min. | 2 | 1.5 | 1.5 |
| 4 min. | 2.5 | 2 | 2 |
| 5 min. | 3 | 2 | 2 |
| 7.5 min. | 4 | 2.5 | 2.5 |
| 10 min. | 4 | 3 | 3 |
| 15 min. | 4 | 4 | 4 |

Anquamine 401 curing agent contains a modified tetraethylene pentamine adduct

Table 5 shows that the film containing the modified aliphatic amine has good blush resistance but poor viscosity build. These results also confirm the speculation that polyethylene polyamines of higher molecular weight are required to increase viscosity build.

TABLE 6

| Parts Polymer of Ex. 1 | 100 | 100 | 100 |
|---|---|---|---|
| Parts Ancamide 375A | 0 | 1 | 2 |
| Viscosity | 2110 | 5600 | 10280 |
| Film | Clear | Clear | Clear |
| Gritty | No | Very slight | Slight |
| 1 min. | 1 | 1 | 1 |
| 2 min. | 2 | 2 | 1 |
| 3 min. | 2 | 2 | 2 |
| 4 min. | 2.5 | 2.5 | 2.5 |
| 5 min. | 3 | 2.5 | 2.5 |
| 7.5 min. | 4 | 3 | 3 |
| 10 min. | 4 | 4 | 4 |

Ancamide 375A curing agent contains a long chain polyamide

Table 6 shows that a long chain polyamide shows improved viscosity build compared to that of the polyamines employed in Tables 4 and 5. Blush resistance remains excellent.

TABLE 7

| Parts Polymer of Ex. 1 | 100 | 100 | 100 |
|---|---|---|---|
| Parts Jeffamine D230 | 0 | 1 | 2 |
| Viscosity | 2110 | 3050 | 3190 |
| Film | Clear | Clear | Clear |
| Gritty | No | Slight | Slight |
| Blush | | | |
| 1 min. | 1 | 0 | 0 |
| 2 min. | 2 | 1 | 1 |
| 3 min. | 2 | 1 | 1 |
| 4 min. | 2.5 | 2 | 2 |
| 5 min. | 3 | 2 | 2.5 |
| 7.5 min. | 4 | 2 | 2.5 |
| 10 min. | 4 | 2 | 2.5 |
| 15 min. | 4 | 2.5 | 3 |
| 20 min. | | 2.5 | 4 |
| 25 min. | | 3 | 4 |
| 30 min. | | 3 | 4 |
| 35 min. | | 3 | |
| 40 min. | | 4 | |

Jeffamine ® D230 contains poly(oxypropylene)diamine; supplied by Huntsman.

Table 7 shows the polyether polyamine offered excellent blush resistance but poor viscosity build. Higher level of polyether polyamines or higher molecular weight polyamines may be required.

TABLE 8

| Parts Polymer of Ex. 1 | 100 | 100 | 100 |
|---|---|---|---|
| Parts Ancamine 1922A | 0 | 1 | 2 |
| Viscosity | 2110 | 3130 | 3200 |
| Film | Clear | Clear | Clear |
| Gritty | No | Slight | Slight |
| Blush | | | |
| 1 min. | 1 | 1 | 1 |
| 2 min. | 2 | 1 | 1 |
| 3 min. | 2 | 1.5 | 1.5 |
| 4 min. | 2.5 | 2 | 2 |
| 5 min. | 3 | 2 | 2 |
| 7.5 min. | 4 | 2.5 | 2.5 |
| 10 min. | 4 | 3 | 3 |
| 15 min. | 4 | 4 | 3 |

Ancamine 1922A curing agent contains an unmodified glycol ether-based aliphatic amine Table 8 shows the amine affords good blush resistance with only modest viscosity build. These ether polyamines (Tables 7 and 8) seem to offer similar viscosities to the low molecular weight polyethylene polyamines.

TABLE 9

| Parts Polymer of Ex. 1 | 100 | 100 | 100 |
|---|---|---|---|
| Parts Anquamine 287 | 0 | 1 | 2 |
| Viscosity | 2110 | 5600 | 10280 |
| Film | Clear | Clear | Clear |
| Gritty | No | Very slight | Slight |
| Blush | | | |
| 1 min. | 1 | 1 | 1 |
| 2 min. | 2 | 2 | 1 |
| 3 min. | 2 | 2 | 2 |
| 4 min. | 2.5 | 2.5 | 2.5 |
| 5 min. | 3 | 2.5 | 2.5 |
| 7.5 min. | 4 | | |

Anquamine 287 curing agent is a Mannich base amine adduct.

Table 9 shows that the use of this polyamine resulted in superior blush resistance compared to the control. Viscosity build is reasonably good and higher than the linear, lower molecular weight polyethylene polyamines (e.g., Table 3) and the glycol of Table 8.

TABLE 10

| Parts Polymer of Ex. 1 | 100 | 100 | 100 |
|---|---|---|---|
| Parts Epilink 701 | 0 | 1 | 2 |
| Viscosity | 2110 | 11580 | 162000 |
| Film | Clear | Clear | Clear |
| Gritty | No | Slight | Minor |
| Blush | | | |
| 1 min. | 1 | 1 | 1 |
| 2 min. | 2 | 2 | 2 |
| 3 min. | 2 | 2 | 2 |
| 4 min. | 2.5 | 2.5 | 2.5 |
| 5 min. | 3 | 2.5 | 2.5 |
| 7.5 min. | 4 | 3 | 3 |
| 10 min. | | 4 | 4 |

Epilink 701 contains meta-xylenediamine; supplied by Air Products and Chemicals, Inc.

Table 10 shows that addition of meta-xylenediamine resulted in bottle labeling adhesives having excellent blush resistance but also resulted in high viscosity builds when going from 1 to 2 parts by weight of the emulsion. Some of the effect may be caused by the lower solubility of the aromatic amine in the emulsion than, for example, the linear polyethylene polyamines. These data also suggest that blends of the meta-xylenediamine with an amine such as cyclohexylpropane diamine (Table 2) may afford excellent blush resistance and tailored viscosity builds in the emulsion.

TABLE 11

| Parts Polymer of Ex. 1 | 100 | 100 | 100 |
|---|---|---|---|
| Parts Ancamine 2168 | 0 | 1 | 2 |
| Viscosity | 2110 | 6420 | 200000 |
| Film | Clear | Clear | Clear |
| Gritty | No | Lumpy | Slight |
| Blush | | | |
| 1 min. | 1 | 1 | 1 |
| 2 min. | 2 | 2 | 2.5 |
| 3 min. | 2 | 2 | 3 |
| 4 min. | 2.5 | 2 | 3 |
| 5 min. | 3 | 3 | 3 |
| 7.5 min. | 4 | 4 | 4 |
| 10 min. | 4 | 4 | 4 |
| 15 min. | 4 | 4 | 4 |

Ancamine 2168 curing agent contains a mixture of partially hydrogenated methylenedianiline oligomers.

Table 11 shows that a partially hydrogenated mixture of methylenedianiline oligomers offers good blush resistance but also high viscosity build. This amine is difficult to incorporate into the emulsion. Table 12 shows the impact of dilution of this normally solid polyamine.

TABLE 12

| Polymer of Ex. 1 | 100 | 100 | 100 |
|---|---|---|---|
| Parts Ancamine 2168:IPDA | 0 | 1 | 2 |
| Viscosity | 2110 | 11580 | 162000 |
| Film | Clear | Clear | Clear |
| Gritty | No | Slight | Minor |
| Blush | | | |
| 1 min. | 1 | 1 | 1 |
| 2 min. | 2 | 2 | 2 |
| 3 min. | 2 | 2 | 2 |
| 4 min. | 2.5 | 2.5 | 2.5 |
| 5 min. | 3 | 2.5 | 2.5 |
| 7.5 min. | 4 | 3 | 3 |
| 10 min. | | 4 | 4 |

Ancamine 2168:IPDA is a 1:1 mixture of Ancamine 2168 curing agent and isophorone diamine.

Table 12 shows good blush resistance with lower viscosity than is shown with the partially hydrogenated mixture of methylenedianiline oligomers in Table 11. This example is important to show that these amines, in small amounts, afford blush resistance to acrylate bottle labeling adhesives and that viscosities within desired ranges can be achieved with appropriate blending without sacrificing blush resistance.

TABLE 13

| Parts Polymer of Ex. 1 | 100 | 100 | 100 |
|---|---|---|---|
| Parts Ancamide 503 | 0 | 1 | 2 |
| Viscosity | 2110 | 3100 | 4000 |
| Film | Clear | Clear | Clear |
| Gritty | No | No | No |
| Blush | | | |
| 1 min. | 1 | 0 | 0 |
| 2 min. | 2 | 1 | 0 |
| 3 min. | 2 | 1 | 0 |

TABLE 13-continued

|   |   |   |   |
|---|---|---|---|
| 4 min. | 2.5 | 2 | 0 |
| 5 min. | 3 | 2 | 0 |
| 7.5 min. | 4 | 3 | 0 |
| 10 min. | 4 | 4 | 0.5 |
| 15 min. | 4 | 4 | 1 |
| 20 | | | 1.5 |
| 25 | | | 2 |
| 30 | | | 2.5 |
| 35 | | | 3 |
| 40 | | | 3 |
| 45 | | | 4 |

Ancamide 503 curing agent contains aliphatic polyalkylene polyamine-polyamide.

Table 13 shows the long chain polyamide offers excellent blush resistance but offers little viscosity build. Blush resistance was very good even at the 45 minute level (This sample was exposed for a longer period of time than other samples; some of the other amines may have performed as well if exposure continued.) The low viscosity build is somewhat surprising as it was thought viscosity should have been higher.

TABLE 14

|   |   |   |   |
|---|---|---|---|
| Parts Polymer of Ex. 1 | 100 | 100 | 100 |
| Parts Ancamide 350A | 0 | 1 | 2 |
| Viscosity | 2110 | 3680 | 9940 |
| Film | Clear | Clear | Clear |
| Gritty | No | Slight | Slight |
| Blush | | | |
| 1 min. | 1 | 1 | 0 |
| 2 min. | 2 | 2 | 1 |
| 3 min. | 2 | 2 | 1 |
| 4 min. | 2.5 | 2 | 1 |
| 5 min. | 3 | 2 | 1.5 |
| 7.5 min. | 4 | 3 | 2.5 |
| 10 min. | 4 | 4 | 3 |
| 15 min. | 4 | 4 | 4 |

Ancamide 350 A curing agent contains a polyamide having residual amines.

Table 14 shows that excellent blush resistance is achieved with better viscosity build than the amine of Table 13, although the amines were similar.

Although not intending to be bound by theory, it is believed that blush resistance is achieved by replacing an ammonia cation in a free film with a hydrophobic long chain diamine. This creates a hydrophobic area adjacent to the water sensitive acid group, e.g., carboxyl group, on the colloid by cationic neutralization. The diamines, unexpectedly, do not destabilize the emulsion, cause grit or undesirable aging effects.

What is claimed is:

1. In a clear bottle labeling adhesive comprised of an acrylic polymer formed by the emulsion polymerization of at least one alkyl ester of acrylic acid in the presence of a stabilizer system comprised of a polymer containing polymerized units of a carboxylic acid monomer, the improvement in blush resistance of said adhesive which comprises:
   addition of from 0.25 to 5 weight parts of a long chain hydrophobic polyamine or a long chain hydrophobic polyamide containing residual amine per 100 weight parts of the acrylic polymer.

2. The bottle labeling adhesive of claim 1 wherein the stabilizer system is comprised of a polymer comprising polymerized units of styrene and acrylic acid.

3. The bottle labeling adhesive of claim 2 wherein the long chain hydrophobic polyamine is selected from the group consisting of an aliphatic polyamine, a cycloaliphatic polyamine, an aromatic polyamine, a methylene bridged cyclohexane diamine, a hydrogenated derivative of methylenedianiline, and a polyether polyamine, wherein the number of carbons in said long chain hydrophobic polyamine is 6 to 25.

4. The bottle labeling adhesive of claim 3 wherein the long chain hydrophobic polyamine is a cycloaliphatic amine selected from the group consisting of cyclohexane diamine, methylcyclohexane diamine, methylene di(4-cyclohexylamine), cyclohexyl propanediamine, and isophorone diamine.

5. The bottle labeling adhesive of claim 3 wherein the long chain hydrophobic polyamide is formed from a long chain polyethylene polyamine and a $C_{6-20}$ carboxylic acid.

6. The bottle labeling adhesive of claim 4 wherein the acrylic polymer has from 1 to 2 weight parts isophorone diamine per 100 weight parts of the acrylic polymer.

* * * * *